(12) United States Patent
Anderson et al.

(10) Patent No.: US 9,665,718 B2
(45) Date of Patent: May 30, 2017

(54) CORRELATING A TASK WITH COMMANDS TO PERFORM A CHANGE TICKET IN AN IT SYSTEM

(71) Applicant: INTERNATIONAL BUSINESS MACHINES CORPORATION, Armonk, NY (US)

(72) Inventors: Eric M. Anderson, Friendswood, TX (US); Heather M. Hinton, Austin, TX (US); Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 14/211,135

(22) Filed: Mar. 14, 2014

(65) Prior Publication Data

US 2015/0261956 A1    Sep. 17, 2015

(51) Int. Cl.

| | |
|---|---|
| *G06F 21/57* | (2013.01) |
| *G06F 21/55* | (2013.01) |
| *G06F 21/62* | (2013.01) |
| *G06F 9/46*  | (2006.01) |
| *G06Q 10/06* | (2012.01) |

(52) U.S. Cl.
CPC .............. *G06F 21/57* (2013.01); *G06F 9/46* (2013.01); *G06F 21/554* (2013.01); *G06F 21/629* (2013.01); *G06Q 10/06* (2013.01); *G06F 2221/2111* (2013.01)

(58) Field of Classification Search
CPC .......... G06F 21/57; G06F 9/46; G06F 21/554; G06F 21/629; G06F 2221/2111; G06Q 10/06
See application file for complete search history.

(56) References Cited

U.S. PATENT DOCUMENTS

| | | | |
|---|---|---|---|
| 5,261,070 A | 11/1993 | Ohta | |
| 5,560,008 A * | 9/1996 | Johnson | .............. G06F 21/6218 709/229 |
| 7,073,174 B2 * | 7/2006 | Volkoff | .................. G06Q 10/10 718/100 |

(Continued)

OTHER PUBLICATIONS

Quest Software; Solutions Brief: Developer and Administrator Access to Production; Retrieved from the Internet URL: <<http://www.aspirant.com.sg/download/quest/brochure/questsoftware_developerandadministratoraccesstoproductiontechbrief.pdf>>; retrieved on Apr. 13, 2013; Copyright 2011; 12 pages.

(Continued)

*Primary Examiner* — Benjamin Wu
(74) *Attorney, Agent, or Firm* — Schmeiser, Olsen & Watts; William H. Hartwell

(57) ABSTRACT

An approach is provided for controlling a task. A change ticket is received. A task to perform the change ticket is correlated with command(s) to perform the task, user(s) who are authorized to initiate execution of the command(s), and an authorized location to initiate the execution of the command(s). A request is made by a requestor to execute one of the command(s). It is determined whether (a) the requestor is currently located at the authorized location correlated with the task and (b) the requestor is one of the user(s) correlated with the task. Based in part on (a) and (b) being true, the requested command is executed. If (a) or (b) is false, then execution of the requested command is prevented.

17 Claims, 8 Drawing Sheets

(56) References Cited

U.S. PATENT DOCUMENTS

| | | | |
|---|---|---|---|
| 7,853,675 B2 | 12/2010 | Cannon et al. | |
| 8,327,417 B2* | 12/2012 | Carter | G06F 21/33 |
| | | | 713/182 |
| 8,433,769 B2* | 4/2013 | Cacheria, III | G06Q 10/1057 |
| | | | 709/207 |
| 8,453,256 B2 | 5/2013 | Aggarwal et al. | |
| 8,869,252 B2* | 10/2014 | Asokan | G06F 21/31 |
| | | | 380/229 |
| 9,077,713 B1* | 7/2015 | Zheng | H04W 12/00 |
| 9,330,370 B2* | 5/2016 | Anderson | G06Q 10/0633 |
| 9,356,968 B1* | 5/2016 | Dotan | H04L 63/20 |
| 9,548,907 B2* | 1/2017 | Finn | H04L 41/5074 |
| 2007/0244896 A1* | 10/2007 | Liu | G06F 21/31 |
| 2008/0215713 A1 | 9/2008 | Cannon et al. | |
| 2008/0263644 A1* | 10/2008 | Grinstein | G06F 21/445 |
| | | | 726/6 |
| 2009/0254982 A1* | 10/2009 | Jansen | G06F 21/62 |
| | | | 726/8 |
| 2010/0287620 A1 | 11/2010 | Fanton et al. | |
| 2011/0167260 A1 | 7/2011 | Fanton et al. | |
| 2011/0289547 A1 | 11/2011 | Aggarwal et al. | |
| 2012/0060163 A1* | 3/2012 | Khan | H04L 63/105 |
| | | | 718/103 |
| 2012/0216243 A1 | 8/2012 | Gill et al. | |
| 2012/0260090 A1 | 10/2012 | Hauck et al. | |
| 2013/0073859 A1 | 3/2013 | Carlson et al. | |
| 2013/0091188 A1 | 4/2013 | Du et al. | |
| 2013/0152164 A1 | 6/2013 | Aggarwal et al. | |
| 2013/0247144 A1* | 9/2013 | Marshall | H04L 63/08 |
| | | | 726/1 |
| 2014/0096241 A1* | 4/2014 | Li | H04L 63/12 |
| | | | 726/22 |
| 2015/0012977 A1* | 1/2015 | Huh | G06F 9/468 |
| | | | 726/4 |
| 2015/0350194 A1* | 12/2015 | Gilpin | H04L 63/0815 |
| | | | 726/8 |
| 2016/0078214 A1* | 3/2016 | Angal | G06F 21/44 |
| | | | 726/4 |
| 2016/0191347 A1* | 6/2016 | Finn | G06F 9/44505 |
| | | | 709/223 |

OTHER PUBLICATIONS

Mike Meyers' CISSP Certification Passport; Chapter 2: Access Control; 2002; pp. 29-68.

Hovav et al; Tutorial: Identity Management Systems and Secured Access Control; Communications of the Association for Information Systems; vol. 25, Issue 1, Article 42; Dec. 1, 2009; http://aisel.aisnet.org/cais/vol25/iss1/42; 42 pages.

SAP GRC Regional Implementation Group; How to Performance Optimize SAP GRC Access Control 5.3; Version 1.1; Feb. 2011; 28 pages.

Rodzinka, Mark; Cross-Enterprise Access Control Security for Electronic Health Records: Technical, Practical and Legislation; Thesis Submitted in Partial Fulfillment of the Requirements for the Degree of Master of Science in Computer Science; Rochester Institute of Technology; Sep. 21, 2012; 103 pages.

\* cited by examiner

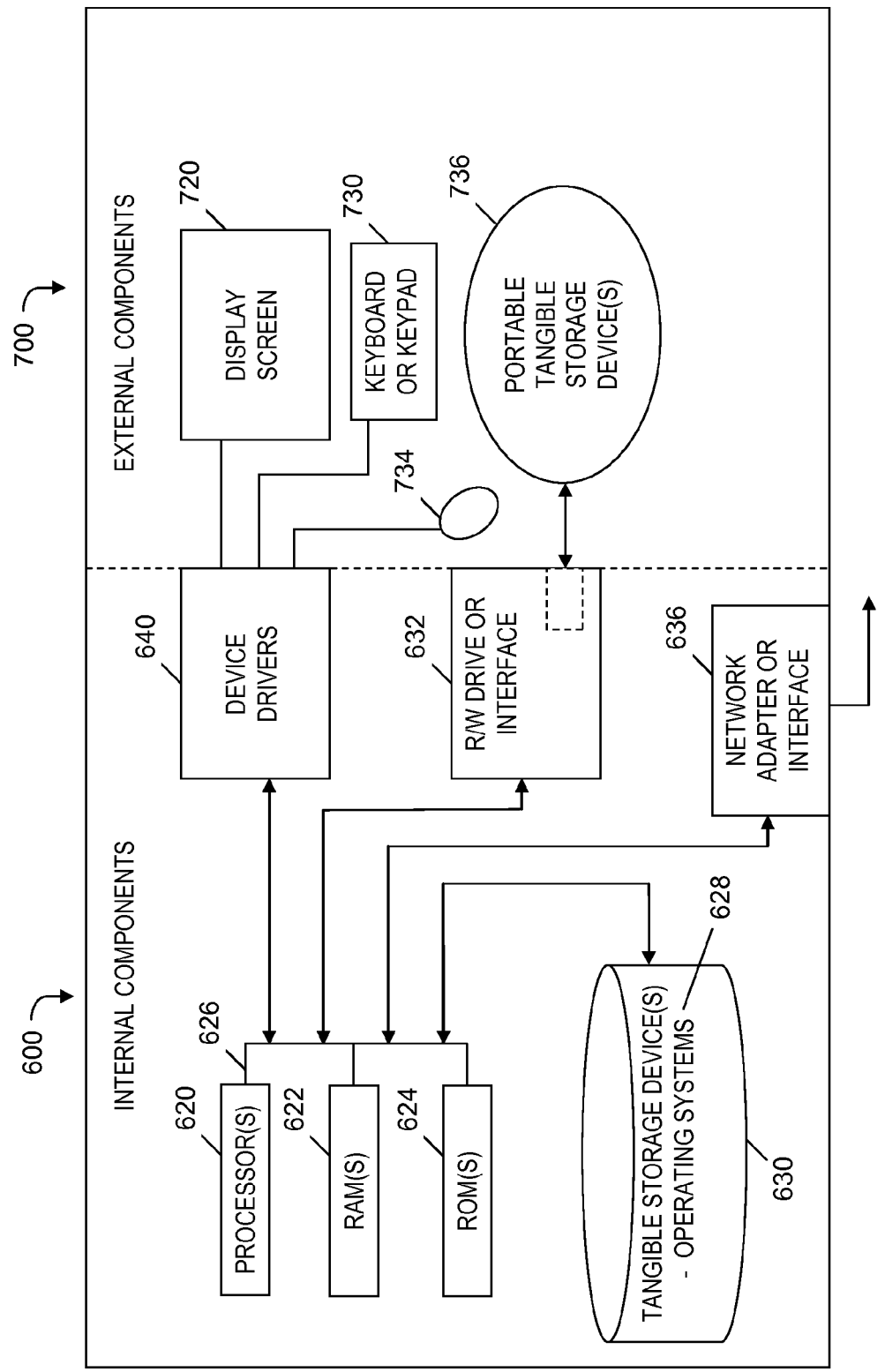

CORRELATING A TASK WITH COMMANDS TO PERFORM A CHANGE TICKET IN AN IT SYSTEM

TECHNICAL FIELD

The present invention relates generally to managing tasks performed on computer systems, and more specifically to controlling the tasks to safeguard the systems.

BACKGROUND

System administrators, help desk personnel and other information technology (IT) workers need access to computer systems that they support. However, occasionally they modify installed programs, data, or configurations, which damages the computer system or the programs or the data it contains, or is otherwise not beneficial. Known techniques limit the types of commands that such personnel are authorized to perform. For example, a help desk personnel without admin or root authority typically cannot change access permission of himself or herself or another IT worker. Some access control is based on an access control table which lists which applications or data files each authorized person can access and whether the access is to write or read only. It was known to limit access based on time of day, for example, during the normal shift hours of the authorized personnel.

Access control to a sensitive IT environment is also controlled to prevent intentional attacks/intrusions while allowing authorized people access. In order to properly manage business critical services, IT systems and services are locked down during specific times (e.g., during a peak business season). Locking down a system may employ change control, access control, monitoring control, hardening control, and/or event control and response. Existing automated access control systems provide conjoint access control (e.g., biometric authentication via a thumb print scan and a retina scan) and can utilize both physical and logical identity management techniques.

*Mike Meyers' CISSP Certification Passport*, Chapter 2—Access Control, by Shon Harris, 2002 teaches access control models and access control techniques. The access control models include discretionary access control (DAC) models, mandatory access control (MAC) models, and role-based access control (RBAC) (i.e., nondiscretionary) models. A DAC model allows owners of resources in an organization to control who accesses the resources and what operations can be performed on the resources, and is typically implemented through access control lists that grant permission to access the resources on a need-to-know basis. A user's access to resources in a DAC model is based entirely on the identity of the user or a role that the user plays within the organization. A MAC model compares a subject's clearance and need-to-know to a classification of a resource to either grant or disallow access to the resource. Every resource in a MAC model has a security label, which includes classification information (e.g., top secret, secret, etc.). In order to access a resource, the subject's clearance must be equal to or greater than the resource's classification. The security label also includes categories for which a subject must have a need-to-know before access to the resource can be granted. An RBAC model makes decisions about granting access to resources based on the rights and permissions assigned to a role or a group. Administrators create roles or groups and assign access rights and permissions to each role or group, instead of directly to the user. A user that is placed into a role inherits the permissions and access rights from the role. Different access control techniques work within the aforementioned models, and include restricted interfaces, access control matrices, and content-dependent access control. One type of restricted interface utilizes a user profile to dictate what icons, menus, applications, commands, and functionality is available within the user's environment. Another type of restricted interface is a database view, which shows a user only the information within a database that the user has access rights to view. Yet another type of restricted interface is a physically constrained interface of a system (e.g., automated teller machine) which presents users with buttons only for specific functions, without allowing access to other capabilities of the system. An access control matrix uses a capability table and an access control list to associate access permissions of a user to a resource. Content-dependent access control grants access to a resource based on the specific content of the resource that a user is trying to access. The above-mentioned access control models and techniques can utilize more granular access control types: (1) physical location (i.e., allow a user to access a resource only if the user has interactively logged in to a computer to indicate that the user is physically at a computer and not logged in remotely); (2) logical location (i.e., restrict access to a resource by an IP address, which is a logical location on a network); (3) time of day (i.e., allow access to a resource between specific hours of the day and specific days of the week); and/or (4) transaction type (i.e., restrict access to a resource based on the type of an operation that is requested to be carried out).

BRIEF SUMMARY

A first embodiment of the present invention is a method, computer system, and computer program product for controlling a task. A computer receives a change ticket. The computer correlates a task to perform the change ticket with one or more commands to perform the task, one or more users who are authorized to initiate execution of the one or more commands to perform the task for the change ticket, and an authorized location to initiate the execution of the one or more commands to perform the task. Subsequent to correlating the task, the computer determines that a request has been made by a requestor to execute one of the one or more commands to perform the task for the change ticket, and in response, the computer determines if (a) the requestor is currently located at the authorized location correlated with the task, and (b) the requestor is one of the one or more users correlated with the task. Based in part on (a) and (b) being true, the computer executes the requested command. If (a) or (b) is false, the computer prevents execution of the requested command.

A second embodiment of the present invention is a method, computer system and computer program product for securing and controlling a task. A computer receives a change ticket. The computer correlates a task to perform the change ticket with one or more commands to perform the task and with a user who is authorized to initiate execution of the one or more commands to perform the task for the change ticket. Subsequent to correlating the task, the computer determines that the user has requested execution of a command to perform the task for the change ticket. If the requested command is one of the one or more commands correlated to the task for the change ticket, the computer allows the execution of the requested command. If the requested command is not one of the one or more commands correlated to the task for the change ticket, the computer prevents the execution of the requested command.

Embodiments of the present invention provide an intelligent compound access control engine that secures and controls specific tasks to be performed on locked down computer systems (i.e., highly managed environments) by specific individuals at pre-specified times from specific physical locations using specific management systems. The compound access control engine captures essential requirements from multiple sources and automates temporary and location-specific access control and task performance control. Embodiments of the present invention allow the addition of entries to and deletion of entries from an access control database based on a lock down service request and/or a pre-specified task window.

BRIEF DESCRIPTION OF THE DRAWINGS

FIG. 6 is a block diagram of components of a computer included in the system of FIG. 1 for securing and controlling a task, in accordance with embodiments of the present invention.

DETAILED DESCRIPTION

Overview

Embodiments of the present invention provide access and task control by linking physical security systems and logical security systems to allow or prohibit a performance of a task by a user at a specific time by verifying that the following items in sequence: (1) the user entered and has not left one of specified physical location(s), (2) the user logged into one of specified managing computer system(s) in one of the specified physical location(s), (3) the user remotely logged into a target computer system from one of the managing computer system(s), (4) the user is one of specified user(s) who are allowed to initiate a performance of the task during one of specified time period(s) (e.g., change windows, maintenance windows, and upgrade windows), and (5) the specific time at which the performance of the task is initiated is included in one of the specified time period(s). The target system can be a locked down system and the specified time period can be included in a time period during which the target computer system is locked down. Rules for specifying the user(s) who are allowed to initiate the performance of the task, the time period(s) during which the task is allowed to be initiated, the target computer system, the managing computer system(s), and the physical location(s) of the managing computer system(s) may be defined by (1) previously agreed upon policies and procedures (e.g., security, lock down, or service management policies), (2) a change and/or service request, or (3) related sources, such as a change and configuration management database.

System for Securing and Controlling a Task

Figure 1:
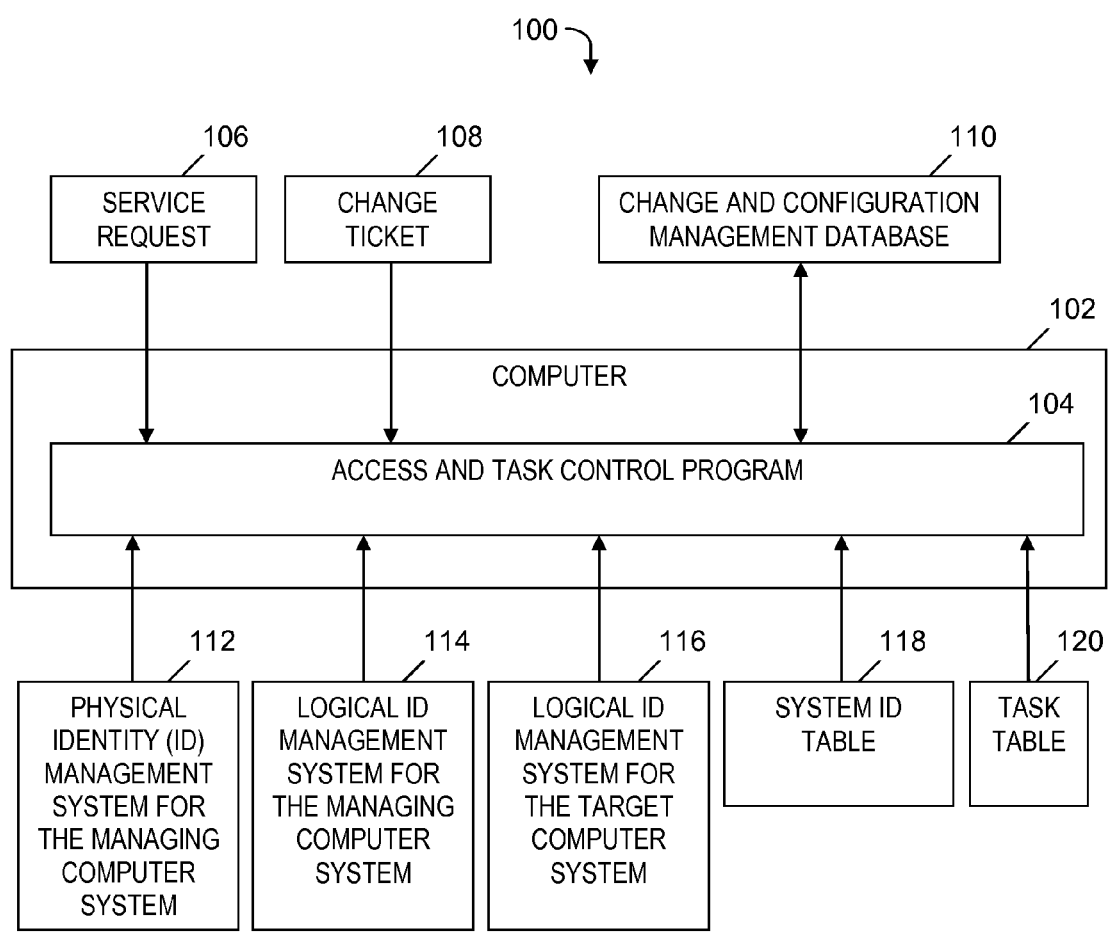
FIG. 1 is a block diagram of a system for securing and controlling a task, in accordance with embodiments of the present invention.

FIG. 1 is a block diagram of a system 100 for securing and controlling a task, in accordance with embodiments of the present invention. System 100 includes a computer 102, which includes a central processing unit (CPU) (not shown), tangible data storage device(s) (not shown) and a memory (not shown). Computer 102 utilizes the CPU to execute a software-based access and task control program 104 (i.e., computer program instructions) stored in the tangible storage device(s) via the memory to secure and control a task.

Access and task control program 104 receives a service request 106 and/or a change ticket 108. Service request 106 is a request to lock down a target computer system during a specified period of time. Change ticket 108 specifies a change to a target computer system (not shown) in a specified period of time (e.g., in a change or maintenance window). Locking down the target computer system in response to service request 106 restricts changes to the target computer system to only critical changes specified by change ticket 108, where the critical changes result from performing specified task(s) initiated by specified user(s) in specified time period(s), where the user(s) utilize specified managing computer system(s) (not shown) in specified location(s) to remotely login to the target computer system to perform the task(s). Access and task control program 104 stores and correlates the aforementioned user(s), task(s), time period, managing computer system(s), and target computer system in a change and configuration management database 110.

Access and task control program 104 receives verification of a person's location from a physical identity (ID) management system 112 that utilizes a combination of physical credentials (e.g., access badge) and biometric authentication (e.g., retina scan) to provide physical access control to a building or other physical structure in which one or more managing computer systems (not shown) are located. The physical access control provided by physical ID management system 112 verifies that a user has entered and has not exited a physical structure that includes a managing computer system. Physical ID management system 112 verifies that a user who is authorized to initiate the task(s) specified by change ticket 108 is in physical proximity to one or more other individuals who may be able to assist the user. For example, a database administrator who is performing database maintenance activities on a locked down database may be required to perform the database maintenance activities while being close to network administrators in a network operation center who are performing tasks associated with a locked down switch.

Access and task control program 104 receives verification of a user logging into a managing computer system from a logical ID management system 114 for the managing computer system, where the logical ID management system 114 for the managing computer system provides logical access control. Logical ID management system 114 for the managing computer system is integrated with physical ID management system 112 so that access and task control program 104 verifies that the following actions happen in sequence: (1) a user enters a physical structure that includes a managing computer system that can initiate a task specified by change ticket 108; and (2) the user logs onto the managing computer system.

Access and task control program 104 receives verification of a user remotely logging into the target computer system from a managing computer system specified in a system ID table 118. In one embodiment, system ID table 118 is included in change and configuration management database 110. The received verification is from a logical ID management system 116 for the target computer system, where the logical ID management system 116 provides system level authentication for the target computer system. The received verification indicates that a packet source for the remote login is a specified managing computer system, and is not a pass through (i.e., the verification indicates that the user did not log in remotely to the specified managing computer system, from which the user then attempts a remote login to the target computer system).

Access and task control program 104 receives verification that the task specified by the change ticket 108 is being initiated by a specified user whose user ID is correlated with the task in a task table 120. Access and task control program 104 can receive the verification that the task is initiated by the specified user by retrieving the correlation between the user ID and the task from task table 120. In one embodiment, task table 120 is included in change and configuration management database 110.

Access and task control program 104 receives verification that a user is initiating the task specified by the change ticket 108 at a time that is within a time period which is correlated with the task within the change and configuration management database 110.

Internal and external components of computer 102 are further described below relative to FIG. 6. The functionality of components of system 100 is further described below in the discussion relative to FIG. 2, FIGS. 3A-3C, FIG. 4, and FIG. 5.

Figure 2:
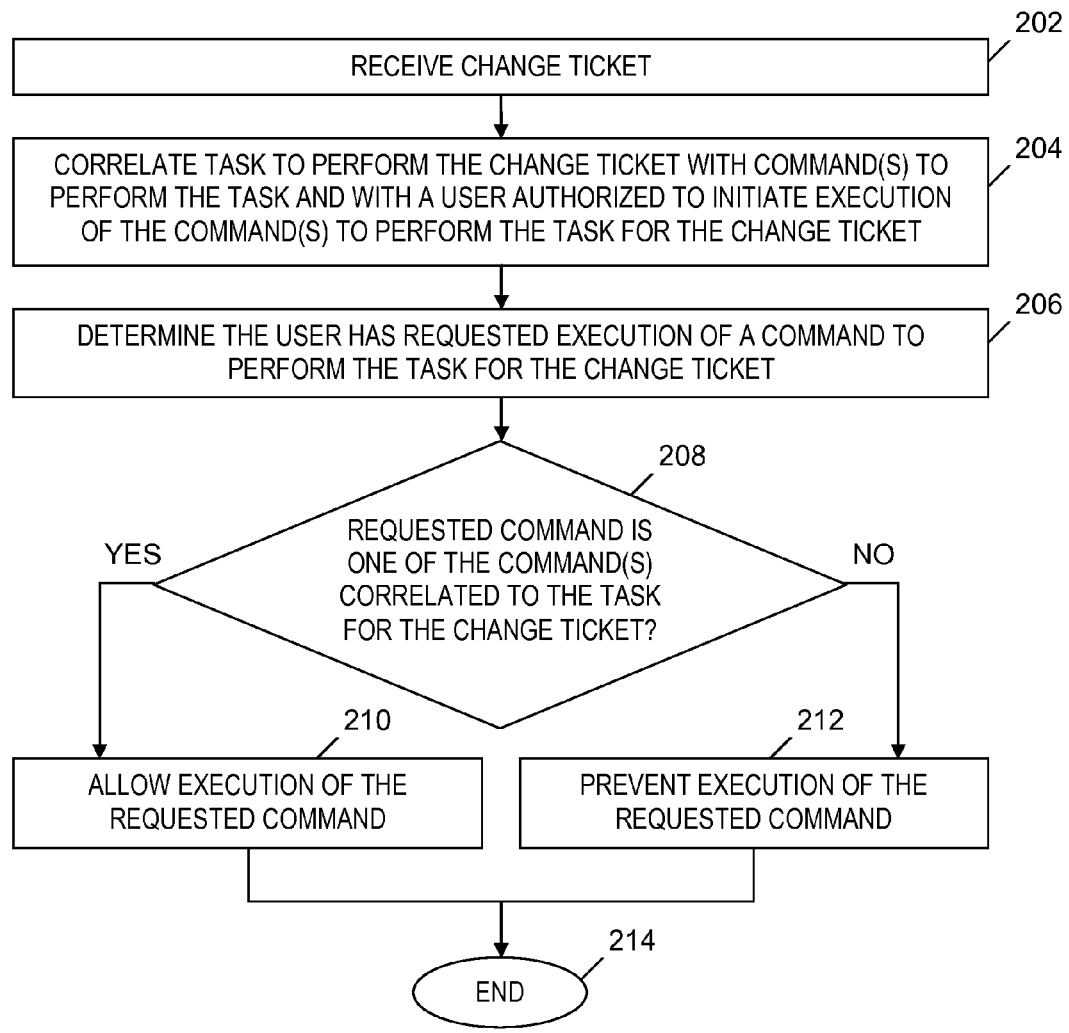
FIG. 2 is a flowchart of an access and task control program executed in the system of FIG. 1, in accordance with embodiments of the present invention.

FIG. 2 is a flowchart of an access and task control program executed in the system of FIG. 1, in accordance with embodiments of the present invention. In step 202, access and task control program 104 (see FIG. 1) receives change ticket 108 (see FIG. 1).

In step 204, access and task control program 104 (see FIG. 1) correlates a task to perform the change specified by change ticket 108 (see FIG. 1) with command(s) to perform the task for change ticket 108 (see FIG. 1) and with a user authorized to initiate execution of the command(s) to perform the task.

In step 206, access and task control program 104 (see FIG. 1) determines that the user has requested execution of a command to perform the task for change ticket 108 (see FIG. 1).

In step 208, access and task control program 104 (see FIG. 1) determines whether the requested command is one of the command(s) that was correlated with the task for change ticket 108 (see FIG. 1) in step 204. If access and task control program 104 (see FIG. 1) determines in step 208 that the requested command is one of the command(s) correlated in step 204, then the Yes branch of step 208 is taken and step 210 is performed. In step 210, access and task control program 104 (see FIG. 1) allows the execution of the requested command.

Returning to step 208, if access and task control program 104 (see FIG. 1) determines that the requested command is not one of the command(s) correlated in step 204, then the No branch of step 208 is taken, and step 212 is performed. In step 212, access and task control program 104 (see FIG. 1) prevents the execution of the requested command.

Step 214 follows step 210 and step 212. The process of FIG. 2 ends at step 214.

Figure 3A:
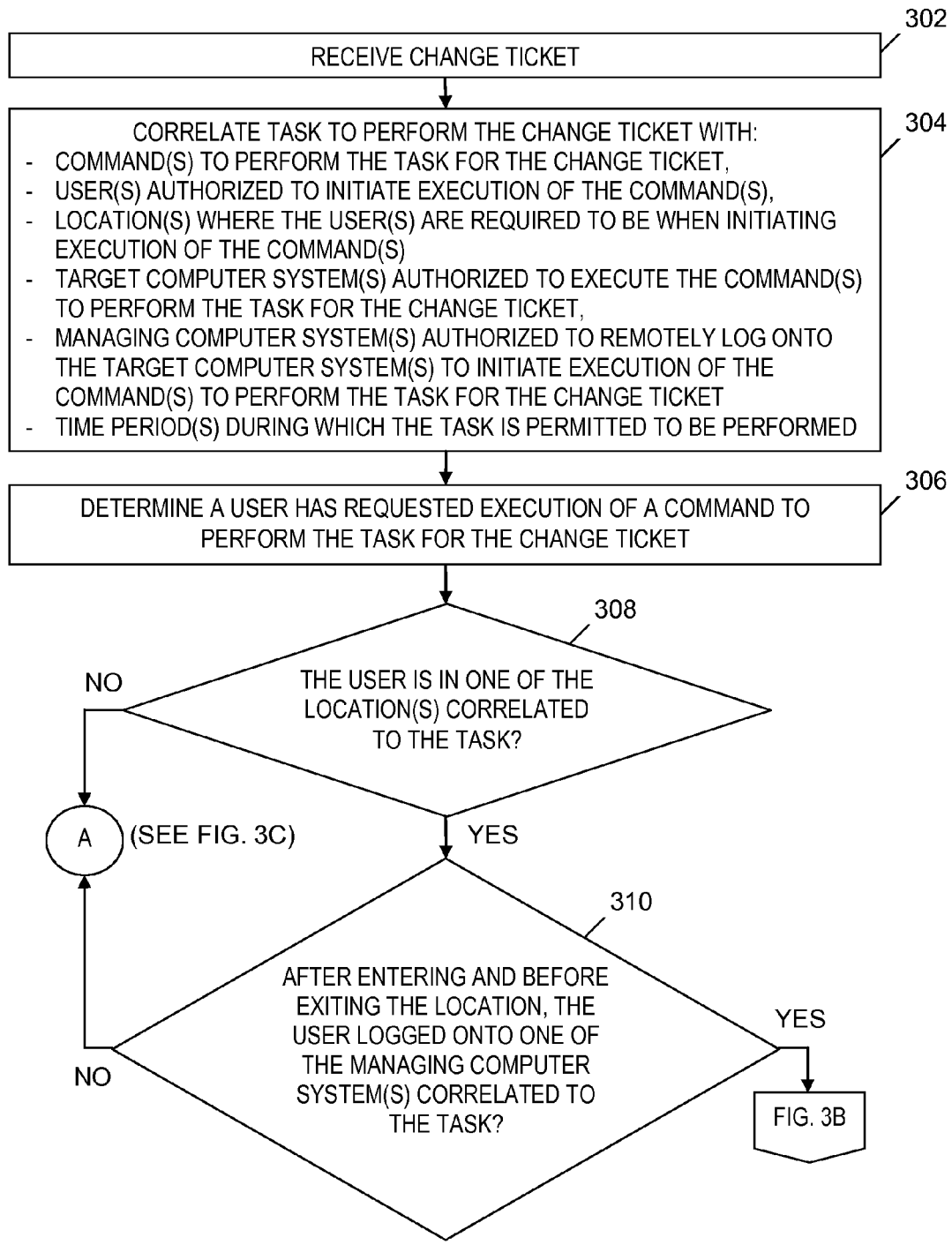
FIGS. 3A-3C is a flowchart of an alternate access and task control program executed in the system of FIG. 1, in accordance with embodiments of the present invention.
Figure 3B:
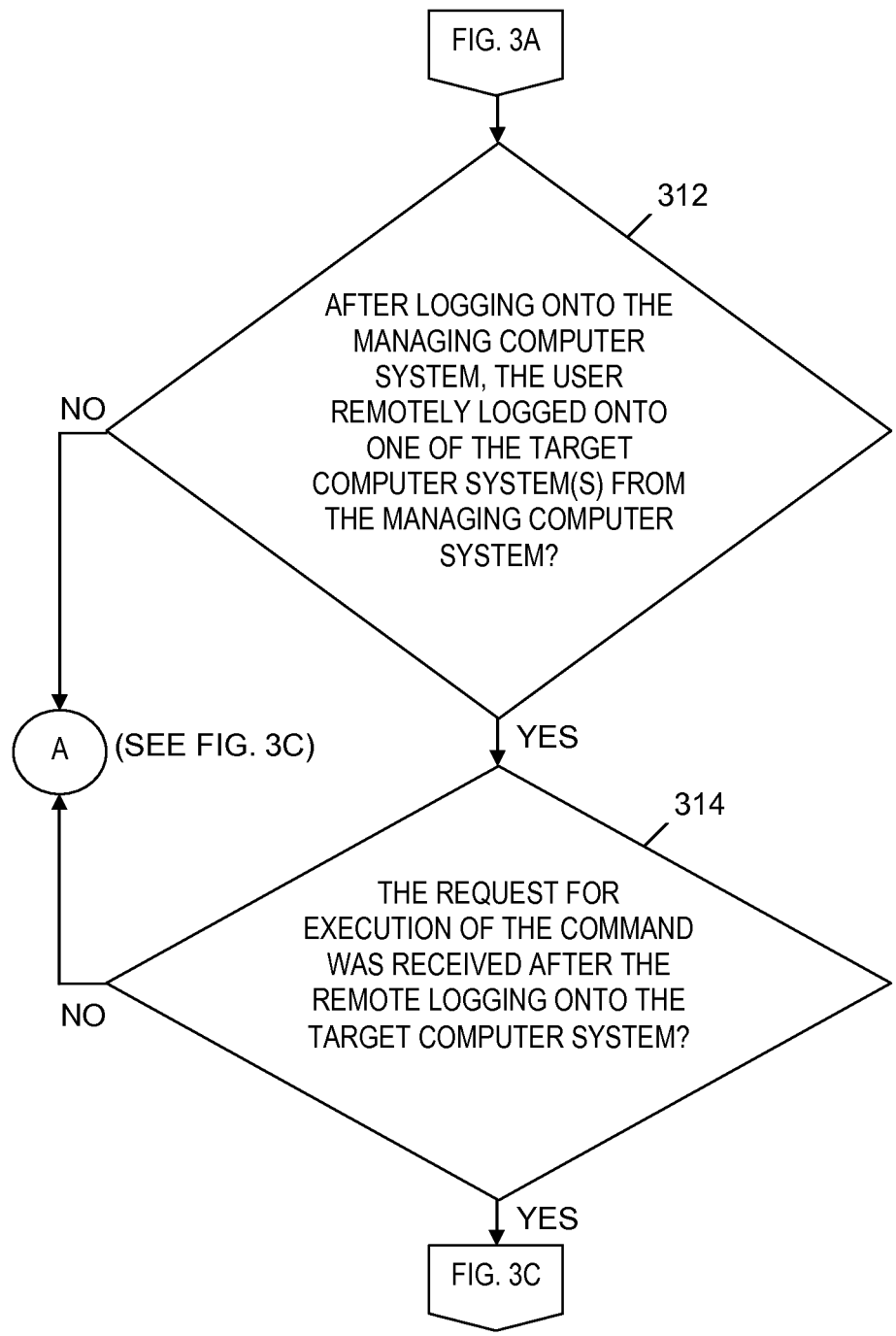
Figure 3C:
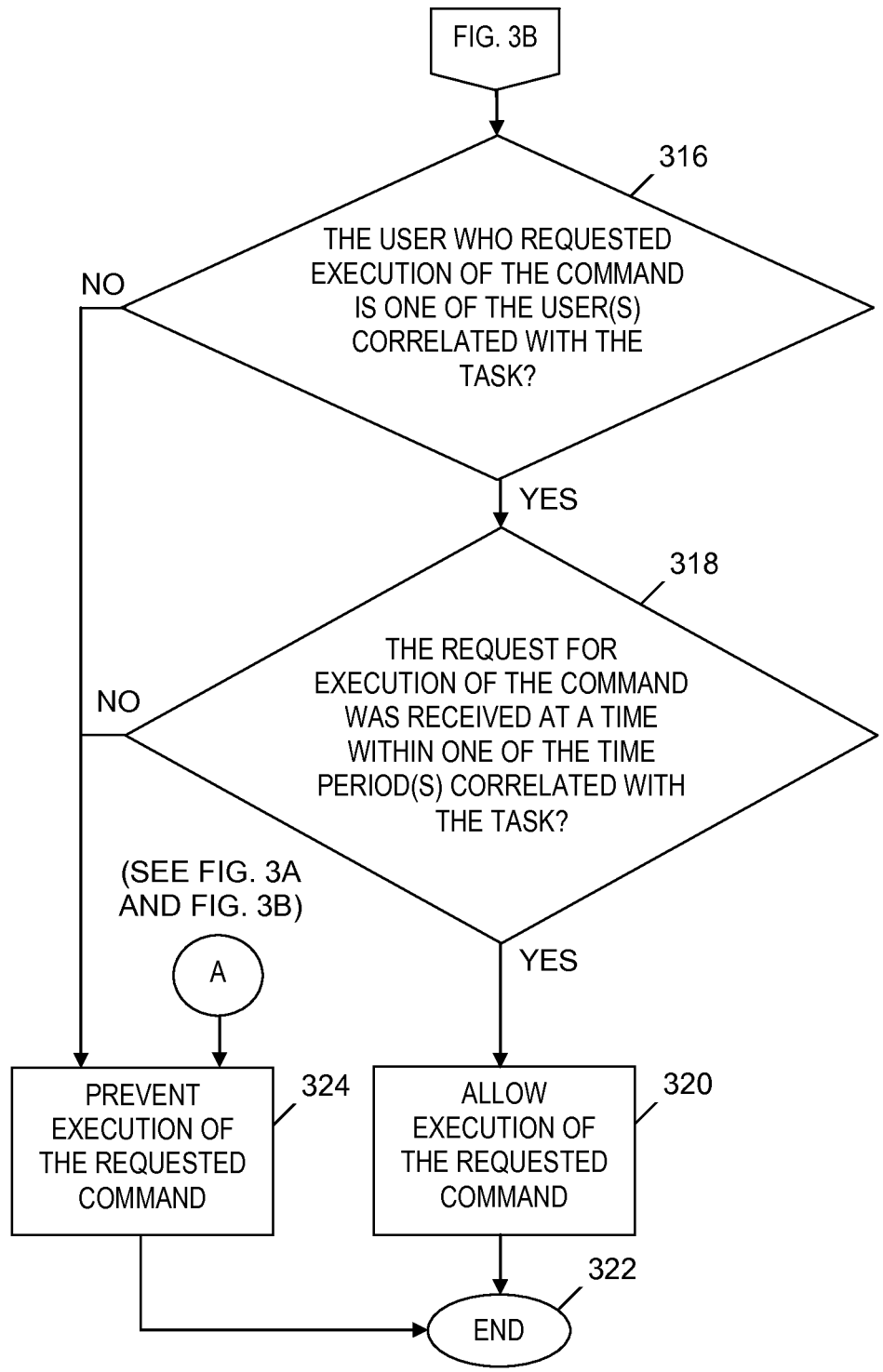

FIGS. 3A-3C is a flowchart of an alternate access and task control program executed in the system of FIG. 1, in accordance with embodiments of the present invention. In step 302, access and task control program 104 (see FIG. 1) receives change ticket 108 (see FIG. 1).

In step 304, access and task control program 104 (see FIG. 1) correlates a task to perform a change specified by change ticket 108 (see FIG. 1) to: (1) command(s) to perform the task for change ticket 108 (see FIG. 1); (2) user(s) who are authorized to initiate execution of the command(s) to perform the task for change ticket 108 (see FIG. 1); (3) location(s) in which the user(s) are required to be when initiating execution of the command(s); (4) target computer system(s) authorized to execute the command(s) to perform the task for change ticket 108 (see FIG. 1); (5) managing computer system(s) authorized to remotely log onto the target computer system(s) to request execution of the command(s) to perform the task for change ticket 108 (see FIG. 1); and (6) time period(s) during which the task is permitted to be performed. Herein, the managing computer systems are also referred to as first computer systems and the target computer systems are also referred to as second computer systems.

Figure 4:
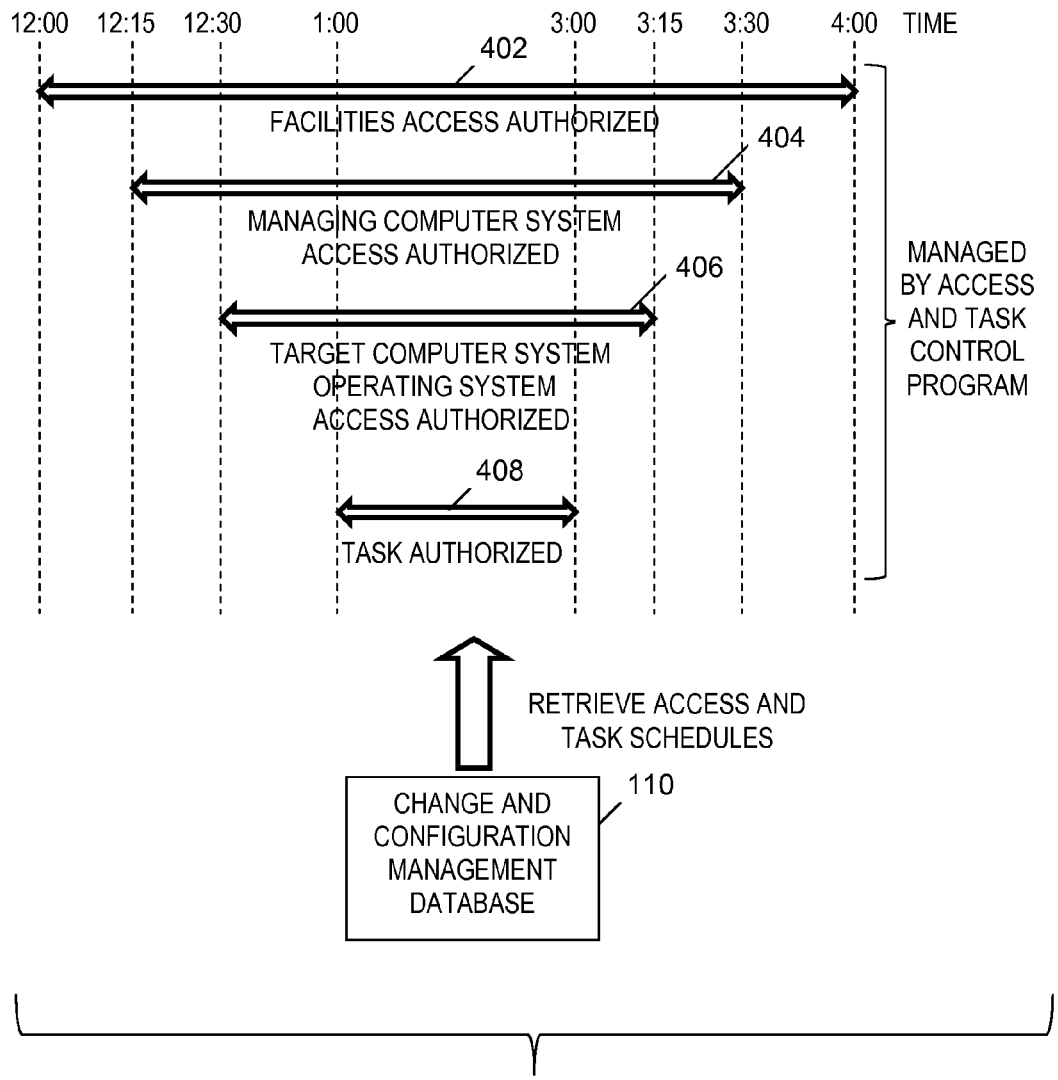
FIG. 4 is an example of access schedules controlled by the access and task control program executed in the system of FIG. 1, in accordance with embodiments of the present invention.

In one embodiment, step 304 (or another step prior to step 308) includes access and task control program 104 (see FIG. 1) determining time periods (i.e., access and task schedules) during which the following activities are authorized: (1) a user's access to the physical structure that includes the managing computer system; (2) the user's access to the managing computer system; (3) the user's access to the operating system of the target computer system; (4) a performance of a task to perform the change specified by change ticket 108 (see FIG. 1). For instance, the aforementioned time periods can be determined by access and task control program 104 retrieving access and task schedules from change and configuration management database 110 (see FIG. 1)). An example of time periods authorized for the aforementioned activities is shown in FIG. 4.

In step 306, access and task control program 104 (see FIG. 1) determines that a user has requested execution of a command to perform the task for change ticket 108 (see FIG. 1) and the requested command is one of the command(s) correlated to the task in step 304. Alternatively, step 306 includes access and task control program 104 (see FIG. 1) determining whether the requested command is one of the command(s) correlated to the task in step 304, and if the requested command is not one of the command(s) correlated to the task, then the alternative process continues with step 324 in FIG. 3C; otherwise, step 308 is performed as described below. In one embodiment, step 306 includes access and task control program 104 (see FIG. 1) receiving a request from the user for the execution of the command to perform the task for change ticket 108 (see FIG. 1). Hereinafter, in the description of the process of FIGS. 3A-3C, the user who has requested execution of the command to perform the task for change ticket 108 (see FIG. 1) is referred to simply as "the user."

Prior to step 308, access and task control program 104 (see FIG. 1) retrieves timestamps to determine a first time when the user entered a physical structure in which one of the managing computer system(s) is located, a second time when the user logged onto the managing computer system located in the physical structure, a third time when the user remotely logged onto the target computer system, and a fourth time when the request for execution of the command determined in step 306 was received by the target computer system or by access and task control program 104 (see FIG. 1).

In step 308, access and task control program 104 (see FIG. 1) determines whether the user entered one of the location(s) correlated to the task in step 304. In one embodiment, step 308 includes determining whether the user permissibly entered a building, room, or other physical structure in which one of the managing computer system(s) is located by information received from a physical access control system. If access and task control program 104 (see FIG. 1) determines in step 308 that the user entered one of the aforementioned location(s) (e.g., permissibly entered the physical structure in which a managing computer system is located), then the Yes branch of step 308 is taken and step 310 is performed.

In step 310, access and task control program 104 (see FIG. 1) determines whether the user logged onto one of the managing computer system(s) correlated to the task in step 304, and whether the logon occurred after the user entered and before the user exited the location determined in step 308 (e.g., the logon occurred after the user entered and before the user exited the physical structure in which the managing computer system is located). If access and task control program 104 (see FIG. 1) determines in step 310 that the user logged onto one of the managing computer system(s) after the user entered and before the user exited the aforementioned location (i.e., the aforementioned second time is subsequent to the aforementioned first time), then the Yes branch of step 310 is taken and the process of FIGS. 3A-3C continues with step 312 in FIG. 3B.

In step 312, access and task control program 104 (see FIG. 1) determines whether the user remotely logged onto one of the target computer system(s) correlated to the task in step 304 (see FIG. 3A) from the managing computer system, and whether the remote logon to the target computer system occurred after the user logged onto the managing computer system. If access and task control program 104 (see FIG. 1) determines in step 312 that the user remotely logged onto one of the target computer system(s) from the managing computer system after the user logged onto the managing computer system (i.e., the aforementioned third time is subsequent to the aforementioned second time), then the Yes branch of step 312 is taken and step 314 is performed.

In step 314, access and task control program 104 (see FIG. 1) determines whether the request for execution of the command in step 306 was received after the user remotely logged onto the target computer system from the managing computer system. If access and task control program 104 (see FIG. 1) determines in step 314 that the request for execution of the command was received after the remote logon to the target computer system (i.e., the aforementioned fourth time is subsequent to the aforementioned third time), then the Yes branch of step 314 is taken and step 316 in FIG. 3C is performed.

In step 316, access and task control program 104 (see FIG. 1) determines whether the user who requested execution of the command was correlated with the task to perform the change ticket 108 (see FIG. 1) in step 304 (see FIG. 3A). In one embodiment, access and task control program 104 (see FIG. 1) looks up an ID of the user or the task in task table 120 (see FIG. 1) or in change and configuration management database 110 (see FIG. 1) to determine whether the user and task are correlated. If access and task control program 104 (see FIG. 1) determines in step 316 that the user is correlated with the task for change ticket 108 (see FIG. 1), then the Yes branch of step 316 is taken and step 318 is performed.

In step 318, access and task control program 104 (see FIG. 1) determines whether the request for the execution of the command was received by access and task control program 104 (see FIG. 1) within the time period that was correlated with the task to perform the change ticket 108 (see FIG. 1) in step 304 (see FIG. 3A). In one embodiment, access and task control program 104 (see FIG. 1) looks up an ID of the task in change and configuration management database 110 (see FIG. 1) to determine whether the task and the time period are correlated. If access and task control program 104 (see FIG. 1) determines in step 318 that the request for the execution of the command was received within the time period correlated with the task, then the Yes branch of step 318 is taken and step 320 is performed.

In step 320, access and task control program 104 (see FIG. 1) allows the execution of the requested command (i.e., the command whose execution was determined to be requested by a user in step 306 in FIG. 3A). After step 320, the process of FIGS. 3A-3C ends at step 322.

Returning to step 318, if access and task control program 104 (see FIG. 1) determines that the request for the execution of the command was received at a time that is not within the time period correlated with the task to perform the change specified in change ticket 108 (see FIG. 1), then the No branch of step 318 is taken and step 324 is performed. In step 324, access and task control program 104 (see FIG. 1) prevents the execution of the requested command (i.e., the command whose execution was determined to be requested by a user in step 306 in FIG. 3A).

Returning to step 316, if access and task control program 104 (see FIG. 1) determines that the user who requested execution of the command is not correlated with the task to perform the change specified in change ticket 108 (see FIG. 1), then the No branch of step 316 is taken, and step 324 is performed, as described above.

Returning to step 314 (see FIG. 3B), if access and task control program 104 (see FIG. 1) determines that the request for the execution of the command was received at a time that is not after the remote logon to the target computer system, then the No branch of step 314 (see FIG. 3B) is taken and step 324 is performed, as described above.

Returning to step 312 (see FIG. 3B), if access and task control program 104 (see FIG. 1) determines that the user did not remotely log onto the target computer system from the managing computer system, or the user's remote logon to the target computer system did not occur after the user logged onto the managing computer system, then the No branch of step 312 (see FIG. 3B) is taken and step 324 is performed, as described above.

Returning to step 310 (see FIG. 3A), if access and task control program 104 (see FIG. 1) determines the user did not log onto the managing computer system or the user's logon to the managing computer system did not occur after the user entered the physical structure in which the managing computer system is located, then the No branch of step 310 (see FIG. 3A) is taken and step 324 is performed, as described above.

Returning to step 308 (see FIG. 3A), if access and task control program 104 (see FIG. 1) determines the user did not permissibly enter the physical structure in which one of the managing computer system(s) is located, then the No branch of step 308 (see FIG. 3A) is taken and step 324 is performed, as described above.

After step 324, the process of FIGS. 3A-3C ends at step 322.

In another embodiment, a variation of the process of FIGS. 3A-3C uses only a proper subset of the set consisting of step 308 (see FIG. 3A), step 310 (see FIG. 3A), step 312 (see FIG. 3B), step 314 (see FIG. 3B), step 316 and step 318, along with a corresponding proper subset of the correlations performed in step 304 (see FIG. 3A).

Examples

FIG. 4 is an example of access schedules controlled by the access and task control program executed in the system of FIG. 1, in accordance with embodiments of the present invention. FIG. 4 includes time periods 402, 404, 406 and 408. Access and task control program 104 (see FIG. 1) retrieves specifications of time periods 402, 404, 406 and 408 from change and configuration management database 110, and manages user access and task performance during the respective time periods, as shown in FIG. 4. During time period 402 (i.e., from 12:00 until 4:00), access to facilities is authorized, where the facilities includes a physical structure in which the managing computer system is located. During time period 404 (i.e., from 12:15 until 3:30), access to the managing computer system is authorized. During time period 406 (i.e., from 12:30 until 3:15), access to the operating system of the target computer system is authorized. During time period 408 (i.e., from 1:00 until 3:00), a receipt of a request for execution of a command to perform the task for change ticket 108 (see FIG. 1) is authorized.

Figure 5:
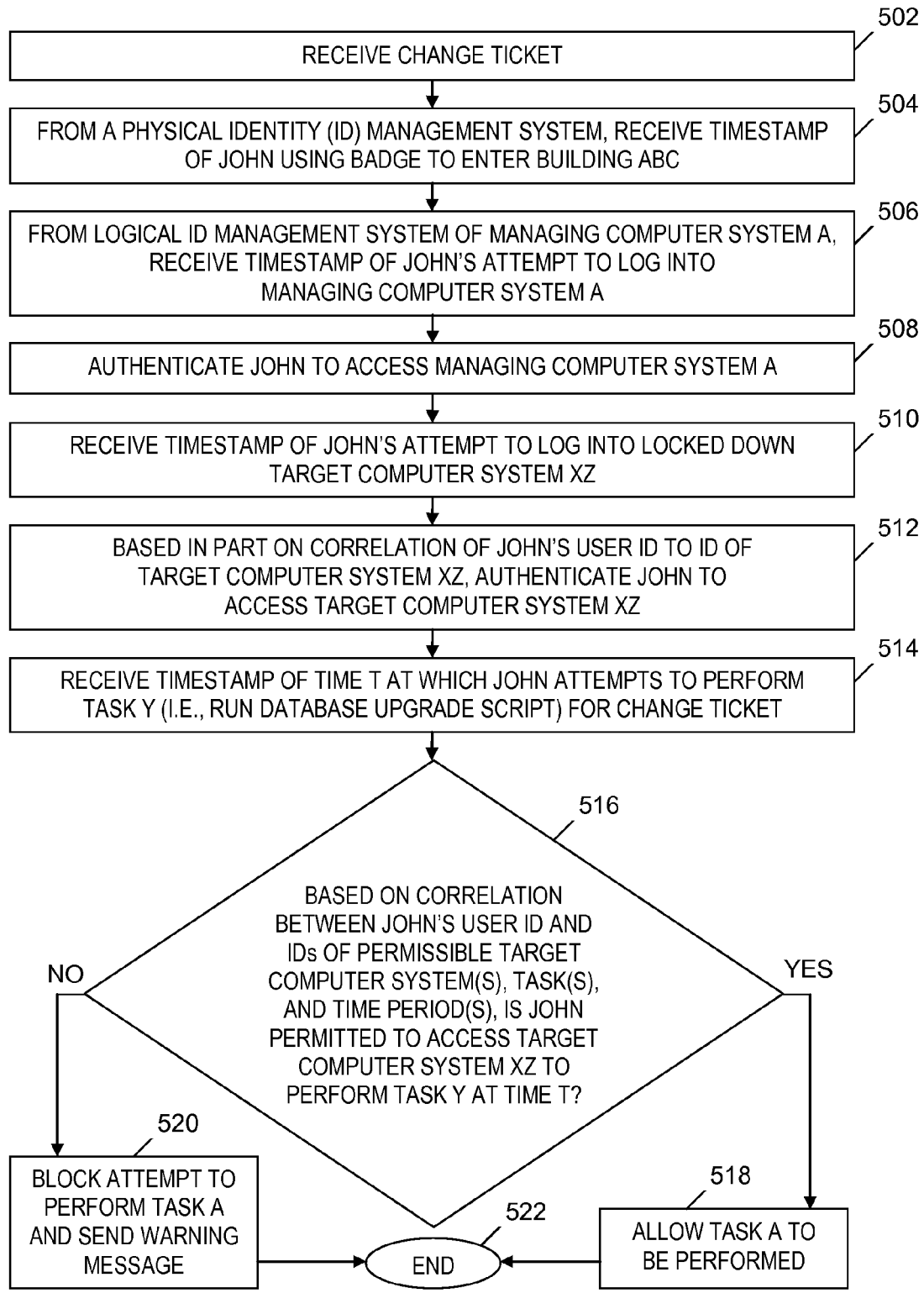
FIG. 5 is an example of controlling the performance of a task in the system of FIG. 1, in accordance with embodiments of the present invention.

FIG. 5 is an example of controlling the performance of a task in the system of FIG. 1, in accordance with embodiments of the present invention. Prior to step 502, target computer system XZ enters a locked down mode in which John is allowed to perform specified tasks within specified time periods by executing specified commands on target computer system XZ. In step 502, access and task control program 104 (see FIG. 1) receives change ticket 108 (see FIG. 1), which specifies a change in a database which requires an execution of a database upgrade script in the locked down target computer system XZ. John uses an access badge to enter building ABC. In step 504, access and task control program 104 (see FIG. 1) receives from physical ID management system 112 (see FIG. 1) a first timestamp indicating when John used the access badge to enter building ABC and receives no indication that John has used his access badge to exit building ABC.

After step 504, John attempts to log into managing computer system A located in building ABC. In step 506, access and task control program 104 (see FIG. 1) receives from logical ID management system 114 (see FIG. 1) a second timestamp of John's attempt to log into managing computer system A.

In step 508, based in part on the first timestamp indicating John entered and has not exited building ABC and the second timestamp indicating John attempted to log into managing computer system A while John was in building ABC, access and task control program 104 (see FIG. 1) receives a verification that John is allowed to log into managing computer system A. John's login to managing computer system A is completed.

In step 510, access and task control program 104 (see FIG. 1) receives a third timestamp indicating John utilizes managing computer system A to attempt to remotely log into the locked down target computer system XZ.

In step 512, based on John's attempt to remotely log into target computer system XZ from managing computer system A and a correlation between John's user ID and an ID of the target computer system XZ, access and task control program 104 (see FIG. 1) authenticates John to allow John to remotely access the locked down target computer system XZ.

In step 514, access and task control program 104 (see FIG. 1) receives a fourth timestamp of Time T at which John attempts to execute a command to perform Task Y (i.e., execute the database upgrade script) for change ticket 108 (see FIG. 1).

In step 516, access and task control program 104 (see FIG. 1) determines whether John is permitted to access target computer system XZ to perform Task Y at Time T, where the determination is based a correlation between John's user ID and (1) the target computer system XZ, (2) task(s) that are permitted to be performed on target computer system XZ, and (3) time period(s) during which the respective task(s) are permitted to be performed. Access and task control program 104 (see FIG. 1) retrieves a record from change and configuration management database 110 (see FIG. 1) that includes John's user ID and the target computer system(s) John is authorized to access, task(s) John is authorized to initiate on the respective target computer system(s), and time period(s) during which the respective task(s) are permitted to be performed.

If access and task control program 104 (see FIG. 1) determines in step 516 that John is permitted to access target computer system XZ to perform Task Y at Time T, then the Yes branch of step 516 is followed and step 518 is performed. In one embodiment, step 516 includes checking that the record retrieved from change and configuration management database 110 (see FIG. 1) includes an ID of target computer system XZ, an ID of Task Y, and an indication of a time period that includes Time T, where the record correlates target computer system XZ with Task Y and correlates Task Y with the time period that includes Time T. In step 518, access and task control program 104 (see FIG. 1) allows Task Y to be performed, which results in the change specified by change ticket 108 (see FIG. 1) being completed.

Returning to step 516, if access and task control program 104 (see FIG. 1) determines that John is not permitted to access target computer system XZ to perform Task Y at Time T, then the No branch of step 516 is followed and step 520 is performed. In step 520, access and task control program 104 (see FIG. 1) blocks the attempt to perform Task Y and sends a warning message to a control center which indicates that the performance of Task Y has been prevented.

Step 522 follows step 518 and step 520. The sample process of controlling the performance of a task in FIG. 5 ends at step 522.

Computer System

FIG. 6 is a block diagram of components of a computer included in the system of FIG. 1 for securing and controlling a task, in accordance with embodiments of the present invention. Computer 102 (see FIG. 1) includes sets of internal components 600 and external components 700 illustrated in FIG. 6. The set of internal components 600 includes one or more processors 620, one or more computer-readable random access memories (RAMs) 622 and one or more computer-readable read-only memories (ROMs) 624 on one or more buses 626, a plurality of operating systems 628 and one or more computer-readable storage devices 630. The operating systems 628 and program instructions 104 (for computer 102 in FIG. 1) are stored on one or more of the respective computer-readable storage devices 630 for execution by one or more of the respective processors 620 via one or more of the respective RAMs 622 (which typically include cache memory). In the illustrated embodiment, each of the computer-readable storage devices 630 is a magnetic disk storage device of an internal hard drive. Alternatively, each of the computer-readable storage devices 630 is a semiconductor storage device such as ROM 624, erasable programmable read-only memory (EPROM), flash memory or any other computer-readable storage device that can store but does not transmit a computer program and digital information.

The set of internal components 600 also includes a read/write (R/W) drive or interface 632 to read from and write to one or more portable tangible computer-readable storage devices 736 that can store but do not transmit a computer program, such as a CD-ROM, DVD, memory stick, magnetic tape, magnetic disk, optical disk or semiconductor storage device. The program instructions 104 (for computer 102 in FIG. 1) can be stored on one or more of the respective portable tangible computer-readable storage devices 736, read via the respective R/W drive or interface 632 and loaded into the respective hard drive or semiconductor storage device 630. The terms "computer-readable storage device" and "computer-readable storage devices" do not mean signal propagation media such as copper cables, optical fibers and wireless transmission media.

The set of internal components 600 also includes a network adapter or interface 636 such as a transmission control protocol/Internet protocol (TCP/IP) adapter card or wireless communication adapter (such as a 4G wireless communication adapter using orthogonal frequency-division multiple access (OFDMA) technology). The program 104 (for computer 102 in FIG. 1) can be downloaded to computer 102 (see FIG. 1) from an external computer or external computer-readable storage device via a network (for example, the Internet, a local area network or other, wide area network or wireless network) and network adapter or interface 636. From the network adapter or interface 636, the program 104 (see FIG. 1) is loaded into the respective hard drive or semiconductor storage device 630. The network may comprise copper wires, optical fibers, wireless transmission, routers, firewalls, switches, gateway computers and/or edge servers.

The set of external components 700 includes a display screen 720, a keyboard or keypad 730, and a computer mouse or touchpad 734. The set of internal components 600 also includes device drivers 640 to interface to display screen 720 for imaging, to keyboard or keypad 730, to computer mouse or touchpad 734, and/or to the display screen for pressure sensing of alphanumeric character entry and user selections. The device drivers 640, R/W drive or interface 632 and network adapter or interface 636 comprise hardware and software (stored in storage device 630 and/or ROM 624.

The program 104 (see FIG. 1) can be written in various programming languages (such as C++) including low-level, high-level, object-oriented or non-object-oriented languages. Alternatively, the functions of program 104 (see FIG. 1) can be implemented in whole or in part by computer circuits and other hardware (not shown).

Based on the foregoing, a computer system, method and program product have been disclosed for securing and controlling a task. However, numerous modifications and substitutions can be made without deviating from the scope of the present invention. Therefore, the present invention has been disclosed by way of example and not limitation.

What is claimed is:

1. A method of controlling a task, the method comprising the steps of:
   a computer receiving a change ticket;
   the computer correlating a task to perform the change ticket with one or more commands to perform the task, one or more users who are authorized to initiate execution of the one or more commands to perform the task for the change ticket, and an authorized location to initiate the execution of the one or more commands to perform the task; and subsequently,
   the computer determining that a request has been made by a requestor to execute one of the one or more commands to perform the task for the change ticket, and in response, the computer determining if (a) the requestor is currently located at the authorized location correlated with the task, and (b) the requestor is one of the one or more users correlated with the task;
   based in part on (a) and (b) being true, the computer executing the requested command;
   if (a) or (b) is false, the computer preventing execution of the requested command;
   the computer correlating the task to perform the change ticket with one or more first computer systems and with one or more second computer systems, each of the one or more users authorized to utilize a respective first computer system included in the one or more first computer systems to remotely log into a respective second computer system included in the one or more second computer systems to initiate the execution of the one or more commands by the respective second computer system;
   the computer determining a first computer system was utilized by the requestor to make the request to execute the requested command;
   the computer determining a second computer system was remotely logged into by the first computer system to receive the request to execute the requested command;
   the computer determining if (c) the first computer system is one of the one or more first computer systems and (d) the second computer system is one of the one or more second computer systems;
   based in part on (c) and (d) being true, the computer executing the requested command; and
   if (c) or (d) is false, the computer preventing execution of the requested command.

2. The method of claim 1, further comprising the steps of:
   the computer determining the requestor is in the location by receiving a verification from one or more physical access control systems that the requestor has entered a physical structure at the location and has not exited the physical structure;
   the computer determining the requestor is logged into the first computer system which is in the physical structure at the location;
   the computer determining the requestor is remotely logged into the second computer system via the first computer system; and
   the computer determining the requestor is one of the one or more users correlated with the task,
   wherein the step of determining the requestor is logged into the first computer system is performed subsequent to the step of determining the requestor is in the location, wherein the step of determining the requestor is remotely logged into the second computer system is performed subsequent to the step of determining the requestor is logged into the first computer system, wherein the step of determining the requestor is one of the one or more users correlated with the task is performed subsequent to the step of determining the requestor is remotely logged into the second computer system, and
   wherein the step of executing the requested command is based in part on the step of determining the requestor is logged into the first computer system being performed subsequent to the step of determining the requestor is in the location, the step of determining the requestor is remotely logged into the second computer system being performed subsequent to the step of determining the requestor is logged into the first computer system, and the step of determining the requestor is one of the one or more users correlated with the task being performed subsequent to the step of determining the requestor is remotely logged into the second computer system.

3. The method of claim 2, further comprising the steps of:
the computer correlating the task to perform the change ticket with one or more time periods, each of the one or more users authorized to initiate the execution of the one or more commands during one of the one or more time periods; and
the computer determining a time the requestor made the request to execute the requested command is included in one of the one or more time periods,
wherein the step of determining the time is included in one of the one or more time periods is performed subsequent to the step of determining the requestor is one of the one or more users correlated with the task, and
wherein the step of executing the requested command is based in part on the step of determining the time is included in one of the one more time periods being performed subsequent to the step of determining the requestor is one of the one or more users correlated with the task.

4. The method of claim 2, further comprising the steps of:
the computer determining the requestor has entered the physical structure at a first time;
the computer determining the requestor logged into the first computer system at a second time;
the computer determining the requestor remotely logged into the second computer system via the first computer system at a third time;
the computer determining a time the requestor made the request to execute the requested command;
the computer determining if (e) the second time is subsequent to the first time, (f) the third time is subsequent to the second time, and (g) the time the requestor made the request to execute the requested command is subsequent to the third time;
based in part on (e), (f) and (g) being true, the computer executing the requested command; and
if (e), (f) or (g) is false, the computer preventing execution of the requested command.

5. The method of claim 1, further comprising the steps of:
the computer correlating the task with one or more time periods, each of the one or more users authorized to initiate the execution of the one or more commands during one of the one or more time periods;
the computer determining a time the requestor made the request to execute the requested command;
the computer determining if the time the requestor made the request to execute the requested command is included in one of the one or more time periods;
based in part on the time the requestor made the request to execute the requested command being included in one of the one or more time periods, the computer executing the requested command; and
if the time the requestor made the request to execute the requested command is not included in one of the one or more time periods, the computer preventing execution of the requested command.

6. The method of claim 1, further comprising the steps of:
the computer correlating the task with one or more first computer systems, one or more second computer systems, and one or more time periods, each of the one or more users authorized to utilize a respective first computer system included in the one or more first computer systems to remotely log into a respective second computer system included in the one or more second computer systems to initiate the execution of the one or more commands by the respective second computer system during one of the one or more time periods;
the computer determining the requestor has entered a physical structure at the location at a first time;
the computer determining the requestor logged into a first computer system at a second time;
the computer determining the requestor remotely logged into a second computer system via the first computer system at a third time;
the computer determining a time the requestor made the request to execute the requested command;
the computer determining if (c) the first computer system is one of the one or more first computer systems, (d) the second computer system is one of the one or more second computer systems, (e) the second time is subsequent to the first time, (f) the third time is subsequent to the second time, (g) the time the requestor made the request to execute the requested command is subsequent to the third time, and (h) the time the requestor made the request to execute the requested command is included in one of the one or more time periods;
based in part on (c), (d), (e), (f), (g) and (h) being true, the computer executing the requested command; and
if (c), (d), (e), (f), (g) or (h) is false, the computer preventing execution of the requested command.

7. A computer program product for controlling a task, the computer program product comprising:
one or more computer-readable storage devices and program instructions stored on the one or more storage devices, the program instructions comprising:
first program instructions to receive a change ticket;
second program instructions to correlate a task to perform the change ticket with one or more commands to perform the task, one or more users who are authorized to initiate execution of the one or more commands to perform the task for the change ticket, and an authorized location to initiate the execution of the one or more commands to perform the task;
third program instructions to determine, subsequent to correlating the task by the second program instructions, that a request has been made by a requestor to execute one of the one or more commands to perform the task for the change ticket, and in response, determine if (a) the requestor is currently located at the authorized location correlated with the task, and (b) the requestor is one of the one or more users correlated with the task;
fourth program instructions to execute the requested command based in part on (a) and (b) being true;
fifth program instructions to prevent execution of the requested command if (a) or (b) is false;
sixth program instructions, stored on the one or more storage devices, to correlate the task to perform the change ticket with one or more first computer systems and with one or more second computer systems, each of the one or more users authorized to utilize a respective first computer system included in the one or more first computer systems to remotely log into a respective second computer system included in the one or more second computer systems to initiate the execution of the one or more commands by the respective second computer system;
seventh program instructions, stored on the one or more storage devices, to determine a first computer system was utilized by the requestor to make the request to execute the requested command;

eighth program instructions, stored on the one or more storage devices, to determine a second computer system was remotely logged into by the first computer system to receive the request to execute the requested command;

ninth program instructions, stored on the one or more storage devices, to determine if (c) the first computer system is one of the one or more first computer systems and (d) the second computer system is one of the one or more second computer systems; and tenth program instructions, stored on the one or more storage devices, to prevent execution of the requested command if (c) or (d) is false, wherein the fourth program instructions execute the requested command based in part on (c) and (d) being true.

8. The computer program product of claim 7, further comprising:

eleventh program instructions, stored on the one or more storage devices, to determine the requestor is in the location by receiving a verification from one or more physical access control systems that the requestor has entered a physical structure at the location and has not exited the physical structure;

twelfth program instructions, stored on the one or more storage devices, to determine the requestor is logged into the first computer system which is in the physical structure at the location;

thirteenth program instructions, stored on the one or more storage devices, to determine the requestor is remotely logged into the second computer system via the first computer system; and fourteenth program instructions, stored on the one or more storage devices, to determine the requestor is one of the one or more users correlated with the task, wherein determining the requestor is logged into the first computer system by the twelfth program instructions is performed subsequent to determining the requestor is in the location by the eleventh program instructions, wherein determining the requestor is remotely logged into the second computer system by the thirteenth program instructions is performed subsequent to determining the requestor is logged into the first computer system by the twelfth program instructions, wherein determining the requestor is one of the one or more users correlated with the task by the fourteenth program instructions is performed subsequent to determining the requestor is remotely logged into the second computer system by the thirteenth program instructions, and wherein the fourth program instructions execute the requested command based in part on determining the requestor is logged into the first computer system by the twelfth program instructions being performed subsequent to determining the requestor is in the location by the eleventh program instructions, determining the requestor is remotely logged into the second computer system thirteenth program instructions being performed subsequent to determining the requestor is logged into the first computer system by the twelfth program instructions, and determining the requestor is one of the one or more users correlated with the task by the fourteenth program instructions being performed subsequent to determining the requestor is remotely logged into the second computer system by the thirteenth program instructions.

9. The computer program product of claim 8, further comprising fifteenth program instructions, stored on the one or more storage devices, to determine a time the user made the request to execute the requested commanded is included in one of one or more time periods, wherein the second program instructions correlate the task to perform the change ticket with the one or more time periods, each of the one or more users authorized to initiate the execution of the one or more commands during one of the one or more time periods, wherein the fifteenth program instructions are executed subsequent to the fourteenth program instructions, and wherein the fourth program instructions execute the requested command based in part on the fifteenth program instructions being executed subsequent to the fourteenth program instructions.

10. The computer program product of claim 8, further comprising:

fifteenth program instructions, stored on the one or more storage devices, to determine the user has entered the physical structure at a first time;

sixteenth program instructions, stored on the one or more storage devices, to determine the user logged into the first computer system at a second time;

seventeenth program instructions, stored on the one or more storage devices, to determine the user remotely logged into the second computer system via the first computer system at a third time;

eighteenth program instructions, stored on the one or more storage devices, to determine a time the requestor made the request to execute the requested command;

nineteenth program instructions, stored on the one or more storage devices, to determine if (e) the second time is subsequent to the first time, (f) the third time is subsequent to the second time, and (g) the time the requestor made the request to execute the requested command is subsequent to the third time; and twentieth program instructions, stored on the one or more storage devices, to prevent execution of the requested command based on (e), (f) or (g) is false, wherein the fourth program instructions execute the requested command based in part on (e), (f) and (g) begin true.

11. The computer program product of claim 7, further comprising:

sixth program instructions, stored on the one or more storage devices, to correlate the task with the one or more time periods, each of the one or more users authorized to initiate the execution of the one or more commands during one of the one or more time periods;

seventh program instructions, stored on the one or more storage devices, to determine a time the requestor made the request to execute the requested command;

eighth program instructions, stored on the one or more storage devices, to determine if the time the requestor made the request to execute the requested command is included in one of the one or more time periods;

ninth program instructions, stored on the one or more storage devices, to prevent execution of the requested command based on the time the requestor made the request to execute the requested command not being included in the one or more time periods correlated with the task, wherein the fourth program instructions execute the requested command based in part on the time the requestor made the request to execute the requested command being included in one of the one or more time periods.

12. The computer program product of claim 7, further comprising:

sixth program instructions, stored on the one or more storage devices, to correlate the task with one or more first computer systems, one or more second computer systems, and one or more time periods, each of the one or more users authorized to utilize a respective first computer system included in the one or more first computer systems to remotely log into a respective second computer system included in the one or more second computer systems to initiate the execution of the one or more commands by the respective second computer system during one of the one or more time periods;

seventh program instructions, stored on the one or more storage devices, to determine the requestor has entered a physical structure at the location at a first time;

eighth program instructions, stored on the one or more storage devices, to determine the requestor logged into a first computer system at a second time;

ninth program instructions, stored on the one or more storage devices, to determine the requestor remotely logged into a second computer system via the first computer system at a third time;

tenth program instructions, stored on the one or more storage devices, to determine a time the requestor made the request to execute the requested command;

eleventh program instructions, stored on the one or more storage devices, to determine if (c) the first computer system is one of the one or more first computer systems, (d) the second computer system is one of the one or more second computer systems, (e) the second time is subsequent to the first time, (f) the third time is subsequent to the second time, (g) the time the requestor made the request to execute the requested command is subsequent to the third time, and (h) the time the requestor made the request to execute the requested command is included in one of the one or more time periods; and twelfth program instructions, stored on the one or more storage devices, to prevent execution of the requested command if (c), (d), (e), (f), (g) or (h) is false, wherein the fourth program instructions execute the requested command based in part on (c), (d), (e), (f), (g) and (h) being true.

13. A computer program product for controlling a task, the computer program product comprising:

one or more computer-readable storage devices and program instructions stored on the one or more storage devices, the program instructions comprising:

program instructions to receive a change ticket;

program instructions to correlate a task to perform the change ticket with one or more commands to perform the task and with a user who is authorized to initiate execution of the one or more commands to perform the task for the change ticket; and program instructions to determine, subsequent to correlating the task by the program instructions to correlate the task, that the user has requested execution of a command to perform the task for the change ticket;

program instructions to allow, if the requested command is one of the one or more commands correlated to the task for the change ticket, the execution of the requested command;

program instructions to prevent, if the requested command is not one of the one or more commands correlated to the task for the change ticket, the execution of the requested command;

program instructions, stored on the one or more storage devices, to correlate one or more locations with the user;

program instructions, stored on the one or more storage devices, to correlate one or more first computer systems with the user;

program instructions, stored on the one or more storage devices, to correlate one or more second computer systems with the user and with the one or more first computer systems;

program instructions, stored on the one or more storage devices, to correlate one or more periods of time with the user and with the task;

program instructions, stored on the one or more storage devices, to determine that the request of the execution of the command was initiated at a time by the user who was in a location and was utilizing a first computer system which was remotely logged into a second computer system;

program instructions, stored on the one or more storage devices, to allow, if the location is one of the one or more locations correlated to the user, the first computer system is one of the one or more first computer systems correlated to the user, the second computer is one of the one or more second computer systems correlated to the user, the task is correlated to the user, and the time is included in one of the one or more time periods correlated with the user, the execution of the requested command by the second computer system; and program instructions, stored on the one or more storage devices, to prevent, if the location is not one of the one or more locations correlated to the user, the first computer system is not one of the one or more first computer systems correlated to the user, the second computer is not one of the one or more second computer systems correlated to the user, the task is not correlated with the user, or the time is not included in any one of the one or more time periods correlated with the user, the execution of the requested command by the second computer system.

14. The computer program product of claim 13, further comprising:

program instructions, stored on the one or more storage devices, to determine the time is included in a period of time during which the second computer system is scheduled to be in lock down mode, wherein the program instructions to allow the execution of the requested command by the second computer system allow the execution of the requested command based in part on the time being included in the period of time during which the second computer system is scheduled to be in lock down mode.

15. The computer program product of claim 13, further comprising:

program instructions, stored on the one or more storage devices, to determine the user is in the location by receiving a verification from one or more physical access control systems that the user has entered a physical structure at the location and has not exited the physical structure;

program instructions, stored on the one or more storage devices, to determine the user is logged into the first computer system which is in the physical structure at the location;

program instructions, stored on the one or more storage devices, to determine the user is remotely logged into the second computer system via the first computer system;

program instructions, stored on the one or more storage devices, to determine the user is correlated to the task; and program instructions, stored on the one or more storage devices, to determine the time is included in a time period correlated to the user and to the task.

16. The computer program product of claim 15, wherein the program instructions to determine the user is logged into the first computer system are executed subsequent to an execution of the program instructions to determine the user is in the location, wherein the program instructions to determine the user is remotely logged into the second computer system are executed subsequent to an execution of the program instructions to determine the user is logged into the first computer system, wherein the program instructions to determine the user is correlated to the task are executed subsequent to an execution of the program instructions to determine the user is remotely logged into the second computer system, and wherein the program instructions to determine the time is included in the time period are executed subsequent to an execution of the program instructions to determine the user is correlated to the task.

17. The computer program product of claim 13, further comprising:

program instructions, stored on the one or more storage devices, to correlate one or more locations with the user;

program instructions, stored on the one or more storage devices, to correlate one or more first computer systems with the user;

program instructions, stored on the one or more storage devices, to correlate one or more second computer systems with the user and with the one or more first computer systems;

program instructions, stored on the one or more storage devices, to determine that the request of the execution of the command is initiated by the user who is in a location and is utilizing a first computer system which is remotely logged into a second computer system;

program instructions, stored on the one or more storage devices, to allow, if the location is one of the one or more locations correlated to the user, the first computer system is one of the one or more first computer systems correlated to the user, the second computer is one of the one or more second computer systems correlated to the user, and the task is correlated with the user, the execution of the requested command by the second computer system; and program instructions, stored on the one or more storage devices, to prevent, if the location is not one of the one or more locations correlated to the user, the first computer system is not one of the one or more first computer systems correlated to the user, the second computer is not one of the one or more second computer systems correlated to the user, or the task is not correlated with the user, the execution of the requested command by the second computer system.

* * * * *